United States Patent [19]

Demangeon et al.

[11] Patent Number: 5,268,029
[45] Date of Patent: Dec. 7, 1993

[54] CATIONIC EMULSIONS OF BITUMINOUS BINDERS OF THE TYPE BITUMEN/POLYMER AND CATIONIC EMULSIFYING SYSTEM PREFERABLY UTILIZABLE FOR OBTAINING SAID EMULSIONS

[75] Inventors: Francis Demangeon, Darndilly; Emile Lopez, Vienne, both of France

[73] Assignee: ELF France, Paris, France

[21] Appl. No.: 762,727

[22] Filed: Sep. 17, 1991

Related U.S. Application Data

[63] Continuation of Ser. No. 425,379, Oct. 16, 1989, filed as PCT/FR86/00041, Feb. 12, 1986.

[30] Foreign Application Priority Data

Feb. 12, 1985 [FR] France .................. 85 02212

[51] Int. Cl.$^5$ ............................................. C08L 95/00
[52] U.S. Cl. ........................... 106/277; 106/278; 106/284.4; 252/311.5; 525/54.2; 525/56; 525/69; 525/104; 525/166; 525/178
[58] Field of Search ............ 106/277, 284.4, 278; 252/311.5, 304, 306, 308; 525/54.2, 56, 69, 178, 166, 104

[56] References Cited

U.S. PATENT DOCUMENTS 3,047,414  7/1962  Katz .................................. 106/273
4,576,648  3/1986  Demangeon et al. ............. 106/269

FOREIGN PATENT DOCUMENTS 7910987  11/1980  France .

OTHER PUBLICATIONS

Derwent Abstract Acc. No. 80-51341C, Lisnitsin et al, Russian Patent No. 708520, Nov. 30, 1979.

Primary Examiner—Amelia Burgess Yarbrough
Attorney, Agent, or Firm—Burgess, Ryan & Wayne

[57] ABSTRACT

This invention provides cationic emulsions of bituminous binders of the bitumen/polymer type, formed by a dispersion of an organic phase of the binder in an aqueous phase containing a cationic nitrogenous emulsifier and a mineral or organic acid, the acid being in appropriate quantity so that the pH of the aqueous phase is comprised between 3 and 9. The aqueous phase also contains an agent consisting of at least one water-soluble sequestering salt of polyfunctional nitrogenized carboxylic acid, particularly a salt of alkaline metal or of amine of mono- and di (hydroxy-2 ethyl) glycine and optionally a water-soluble thickening agent. To obtain the emulsions, which are usable for road applications, the emulsifying agent, the sequestering agent and optionally the thickening agent may be used in the form of a premixture containing the agents and called cationic emulsifying system.

54 Claims, No Drawings

CATIONIC EMULSIONS OF BITUMINOUS BINDERS OF THE TYPE BITUMEN/POLYMER AND CATIONIC EMULSIFYING SYSTEM PREFERABLY UTILIZABLE FOR OBTAINING SAID EMULSIONS

This application is a continuation of application Ser. No. 425,379 filed Oct. 16, 1989, filed as PCT/FR86/00041, Feb. 12, 1987.

FIELD OF THE INVENTION

The invention relates to cationic emulsions of bituminous binders of the bitumen/polymer type In one aspect, the invention relates to a cationic emulsifying system preferably utilizable for obtaining these emulsions.

BACKGROUND OF THE INVENTION

Converting bituminous binders in cationic or anionic emulsions is a well-known technique. The emulsion consists of a dispersion of fine bitumen globules in a continuous aqueous phase The emulsion is called anionic or cationic according to the total electrical charge surrounding the globule which can be negative or positive. In the presence of a continuous electric current, the micellae of bitumen of an emulsion settle on the anode if the emulsion is anionic or on the cathode if the emulsion is cationic.

The conversion of bituminous binders to emulsion makes use of emulsifying agents that favor the dispersion of the globules of binder in the aqueous phase by forming a charged protective shell that prevents their agglomeration.

In the case of anionic emulsions, the emulsifying agent is of the anionic type and preferably consists of a fatty acid alkaline salt. This emulsifying agent is generally mixed with the bituminous binder in a quantity of from 0.05 to 2% by weight. The binder containing the emulsifying agent is then dispersed in an alkaline aqueous phase by passing into an emulsifier.

Cationic emulsions are obtained by using cationic emulsifying agents, which generally consist of nitrogenized organic compounds such as fatty amines, fatty amidoamines, fatty imidoazolines, fatty mono and diquaternary ammonium compounds and reaction products of one or more of said products with ethylene or propylene oxide. The fatty radical of the emulsifying compounds can possess a very diversified chemical structure and the raw materials for the preparation of the emulsifying compounds can originate from different sources such as animal fats, refined petroleum products, vegetable oils and liquid resins. The cationic emulsifying agent is generally dispersed in water to which hydrochloric acid is added. The hydrochloride formed is soluble. The homogeneous solution thus obtained, having a pH generally comprised between 1 and 5, is then put into contact with the bituminous binder in an emulsifier in order to form the emulsion.

Regardless of whether it is anionic or cationic, the emulsion is considered to be a means that allows lowering the viscosity of bituminous binders. The emulsion restores, after rupture, the bituminous binder to which has been added the emulsifying agent used for producing the emulsion. The presence of this emulsifying agent in the bituminous binder is regarded as exerting a favorable effect on the adhesiveness of the binder in the presence of mineral surface, provided it is within a narrow range of pH comprised between 1 and 6.

The largest sale of bituminous emulsions is mainly in the area of building and repair of roads, and essentially in the form of cationic emulsions. Experience in this field shows that cationic emulsions are easier to apply and prevent the numerous inconveniences of anionic emulsions such as the possibility of restoration to emulsion in the presence of water, of unforeseeable rupture in storage and of weak adhesiveness of the binder to the surface of the aggregate.

Cationic bituminous emulsions are mainly used according to two type of technique, namely, coating and encasing.

Coating consists in gluing layers of fine gravel on the surface of the road by means of the bituminous emulsion in order to produce roughness and make the surface impervious. This technique contributes to the creation of a new runway layer.

In encasement, the bituminous emulsion allows the use of layers having a thickness of from 0.4 cm to more than 20 cm, which integrate in all levels of a road structure.

At present, due to the general reduction of budgets for repair and building of roads, the use of the bitumen emulsion is particularly limited to the repair of the surface of roads. However, due to the extreme mechanical demands to which are subjected to mosaics of the surface coatings, the road bitumens of emulsifiable kinds do not have the characteristics necessary that will allow them to bear the tangential stresses due to heavy loads and heavy traffic.

Under these circumstances, the bituminous binders exclusively constituted of bitumen are being increasingly replaced by bituminous binders of the bitumen/polymer type. The bitumen/polymer binders are products obtained from bitumens to which polymers have been added and have eventually been modified by the latter. Optionally, a reagent such as sulfur or a modifying agent and/or an adjuvant can also be present.

Examples of bituminous binders of the bitumen/polymer type comprise preferably:

bitumens modified by olefinic polymers or by mixtures of fatty acids and higher alcohols (French Patent No. 7,627,936 [publication No. 2,364,960] of Sep. 17, 1976);

bitumens modified as above and on which have been grafted elastomers (French Patent No. 7,627,937 [publication No. 2,364,961] of September 17, 1976);

bitumens modified by norbornene (French patent No. 7,630,316 [publication No. 2,367,102] of Oct. 8, 1976);

bitumens modified by dihalopolybutadienes serving as receptive structures to block copolymers and to covulcanizable elastomers (French Patent No. 7,806,160 [publication No. 2,418,812] of Mar. 3, 1978);

bitumens modified by block copolymers styrene/butadiene or styrene/isoprene (French Patent No. 7,639,233 [publication No. 2,376,188] of Dec. 28, 1976); diene (addition No. 7,831,689 [publication No. 2,440,967] of Nov. 9, 1978 to French Patent No. 7,639,233);

bitumens modified by polyethylene waxes (French Patent No. 7,729,953 [publication No. 2,405,288] of Oct. 5, 1977);

bitumens modified by elastomeric acrylic polymers (French Patent No. 7,812,135 [publication No. 2,424,301] of Apr. 25, 1978;

bitumens modified by polymers of the type polyvinyl alcohol, polyamide, polyester, polyurethane;

bitumens modified by olefinic copolymers, preferably among them, ethylene/propylene copolymers or ethylene/propylene/diene copolymers, or by copolymers of olefins and of vinyl monomers, preferably ethylene/vinyl acetate copolymers, ethylene/acrylic ester copolymers, ethylene/vinyl chloride copolymers;

bitumens modified by special polymers of the type of halogenated polymers and preferably fluorinated polymers such as poly-tetrafluoroethylenes or fluorinated and chlorinated polymers, or of the type of silicon polymers such as polysiloxanes;

bituminous compositions obtained by bringing into contact one bitumen with a mother solution containing one polymer, preferably one block copolymer styrene/-conjugated diene and sulfur or a polysulfide or another reactive agent, preferably vinyl monomer, as well as a petroleum fraction and/or a coal oil (French Patents No. 7,818,534 [publication No. 2,429,241] of Jun. 21, 1978 and No. 8,210,095 [publication No. 2,528,439] of Jun. 10, 1982; French Patents No. 7,910,987 [publication No. 2,455,623] of May 2, 1979 and No. 8,216,433 [publication No. 2,533,935] of Sep. 30, 1982);

bitumens modified by a mixture of at least two of the polymers cited above, and mixtures of said modified bitumens.

However, the emulsification of said different bitumens modified by the incorporation of polymers cannot be effected as such, since the improvement on the properties of the bitumens systematically increases the viscosity of the medium, which hinders the preparation of binders modified by polymers making use of the conventional industrial equipments. Under these circumstances, it is necessary to use one or several fluidizing solvents, the main part they play being to reduce the viscosity of the medium and bring it to a range equivalent to that of operation of bitumens of penetration 80/100 and 180/220 between 100° C. and 150° C., that is, 1 to 10 poises. The solvent or solvents selected have among other properties that of being partially volatile while preserving the heavy fractions of plastifying and compatibilizing properties between the polymer and the bitumen.

The applicant has observed that the formulation of emulsions of quick rupture from binders of the bitumen/polymer type fluidized or fluxed by oils of petroleum origin or resulting from the distillation of coal in the presence of conventional cationic emulsifying agents such as those mentioned above, led to emulsions in which the rupture is poor or uncertain. It has been observed, on the other hand, that this rupture was represented by a partial coagulation of the bitumen globules without ever resulting in the first hours, even after several days, in the total coalescence of the micellae of the emulsion, and this, whatever the type of emulsifying agent used and the concentration of said emulsifying agent. This deficiency confers on the residual bituminous binder mechanical characteristics which are very inferior to those of the original anhydrous bitumen/-polymer binder. Therefore, it limits the development of the emulsions of bitumen/polymer binder in the field of producing thin and superficial coatings on roads having very heavy traffic. The applicant has demonstrated in addition that the phenomenon exclusively depended on a double interaction between the solvent and the emulsifying agent for a conventional emulsifying agent such as defined above and between the solvent and the salts contained in the water, namely, alkaline earth salts and metallic salts. The nature of the bitumen and its origin, the type of polymer associated with the bitumen, and the presence of crosslinking or stabilizing reagent, on the contrary, exert no influence on the phenomenon.

SUMMARY OF THE INVENTION

It has been found that the deletereous influence of the interactions between solvent and emulsifying agent and between solvent and salts contained in the water could be suppressed by using in the cationic emulsion of bitumen/polymer binder a specific emulsifying system that results from the association of at least one cationic nitrogenized emulsifying agent with an adjuvant consisting of at least one sequestering salt of a polyfunctional nitrogenized carboxylic acid.

Therefore, an object of the invention is to provide cationic emulsions of bituminous binders of the bitumen/polymer type that are formed in a dispersion of an organic phase consisting of the bitumen/polymer binder in an aqueous phase including a cationic nitrogenized emulsifying agent and an acid, the latter being present in an amount such that the pH of the aqueous phase has a value comprised between 3 and 9, the emulsions being characterized by the fact that their aqueous phase also includes an adjuvant consisting of at least one water-soluble salt of a polyfunctional nitrogenized carboxylic acid in which the sequestration power in relation to the metallic ions is equivalent, in a pH range of from 3 to 9, to a fixation of at least 5 mg calcium ions per gram of salt.

DETAILED DESCRIPTION OF THE INVENTION

The adjuvant is preferably composed of one or more hydrosoluble sequestration agents corresponding to formula (I)

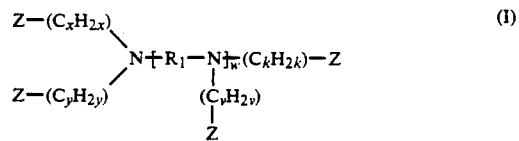

whrein the Z's, can be identical or different and represent a radical selected among the —OH, —COOH and —COOM radicals with at least one Z designating a —COOM radical, the symbols x, y, v and k are identical or different integers of from 1 to 6, preferably from 1 to 4, w is a number having the whole values of 0 to 3, $R_1$ is a hydrocarbylene bivalent radical, particularly alkylene from $C_1$ to $C_8$, preferably from $C_2$ to $C_4$, which can be substituted with one or more functional groups, preferably OH groups, and the symbol M can be different from one group to the other and represents an atom of alkaline metal, an $+NH_2-NH_2$ radical, or a radical of the formula

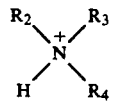

wherein the symbols $R_2$ to $R_4$, which can be identical or different, each represent one hydrogen atom or an organic radical and in particular a hydrocarbyl monovalent radical of $C_1$ to $C_8$, preferably $C_1$ to $C_6$, and which may include one or several functional groups and particularly an OH group, some of the $R_2$ to $R_4$ radicals can be combined to form a heterocycle with the nitrogen atom to which they are bonded. The sequestration agents themselves have no emulsifying properties.

The alkaline metal that can represent the M group is selected among the metals of group IA of the Periodic Classification of Elements such as shown in the HANDBOOK OF CHEMISTRY AND PHYSICS, 46th Edition, published by THE CHEMICAL RUBBER CO., the alkaline metal preferably consisting of sodium or potassium.

The hydrocarbyl radicals eventually replaced by functional groups that can represent the symbols $R_2$ to $R_4$ are in particular alkyl or hydroxyalkyl radicals of $C_1$ to $C_8$, preferably $C_1$ to $C_6$, such as methyl, ethyl, propyl, butyl, pentyl, hexyl, hydroxymethyl, hydroxyethyl, hydroxypropyl, or also cycloalkyl radicals of $C_4$ to $C_8$, preferably cyclopentyl or cyclohexyl, or aromatic radicals of $C_6$ to $C_8$ such as phenyl or tolyl.

When some of the $R_2$ to $R_4$ radicals are combined to form a heterocycle with the nitrogen atom to which they are bonded, the heterocycle is in particular aromatic and preferably of the pyridinic or alicyclic and preferably of the piperidinic type.

The compounds of formula (I) are the salts resulting from the reaction of polyfunctional nitrogenized carboxylic acids of formula (II)

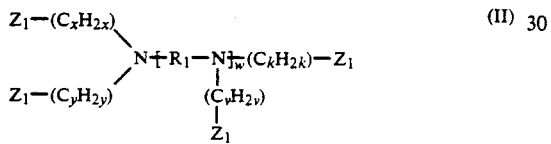

wherein the $Z_1$'s, identical or different represent an —OH or —COOH radical with at least one $Z_1$ group designating a —COOH radical, and the symbols x, y, v, k and $R_1$ have the above meanings with a compound selected among the hydroxides of alkaline metals of group IA of the Periodic Classification of Elements defined above, anhydrous or hydrated ammonia and the amines of formula

the symbols $R_2$ to $R_4$ have the meanings given above.

Quite particularly the adjuvant can consist of one or several salts having the formulae given below

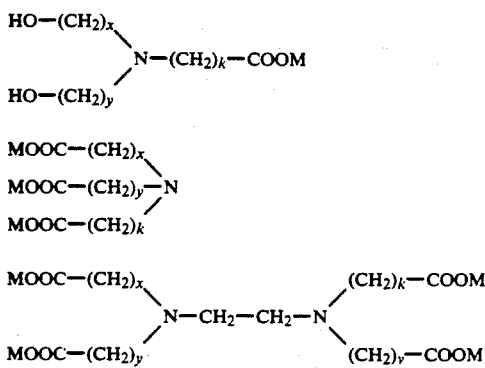

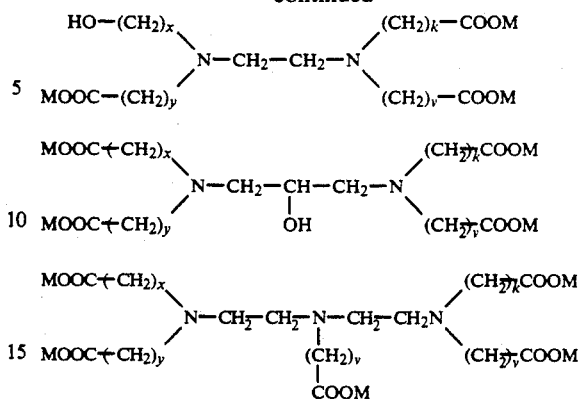

the symbols x, y, v, k and M in these formulae having the meanings given above.

As example of compounds having the above formulae, there can be cited the sodic salt of N,N bis (carboxymethyl) glycine, the disodic salt of N-(hydroxy-2 ethyl) glycine acid, the glycinate of N,N'-1,2-ethanediyl bis N-(carboxymethyl) of hydrazine, the dipotassium salt of N-(hydroxy-2 ethyl) glycine acid and the potassium salt of N,N-di(hydroxy-2 ethyl) glycine acid.

The total concentration of hydrosoluble sequestration agent in the aqueous phase of the emulsion can change broadly according to the hardness of the water used to produce the emulsion and/or the total content of metallic ions of said water. This concentration can advantageously represent from 0.005% to 0.5%, preferably from 0.01% to 0.3, by weight of the emulsion.

The cationic nitrogenized emulsifying agent present in the emulsion can consist of one or several of the cationic nitrogenized emulsifying agents known, the emulsifying agents can be preferably fatty monoamines, polyamines, amidoamines, amidopolyamines, salts or oxides of said amines and amidoamines and reaction products of the above cited compounds with ethylene oxide and/or propylene oxide. A general illustration of cationic nitrogenized emulsifying agents among which can be selected the emulsifying agents utilizable according to the invention is given in the manual of KIRK-OTHMER entitled ENCYCLOPEDIA OF CHEMICAL TECHNOLOGY, third edition, volume 22, pages 377 to 384.

According to an advantageous embodiment of the invention, the cationic nitrogenized emulsifying agent is formed by the association of one or several emulsifying agents A selected among the cationic nitrogenized emulsifying agents of the type monoamines, diamines, amidoamines, oxides of said amines or amidoamines, reaction products of said compounds with ethylene an /or propylene oxide and quaternary ammonium salts with one or several emulsifying agent B selected among the cationic nitrogenized emulsifying agents possessing in their molecule at least three functional groups selected among the amines and amides groups in a manner such that one at least of said functional groups be an amine group, the weight ratio of the total quantity of the compound or compounds A to the total quantity of A and B compounds being in particular from 5% to 95%. This mode of operation results in an open and quick rupture of the emulsion which allows the bitumen/polymer binder immediately to recover its initial properties.

The cationic nitrogenized emulsifying agent that can be used according to the invention can consist preferably of one or several cationic nitrogenized emulsifying agents selected among the following compounds:

fatty monoamines of formula (III) $R_6$-$NH_2$, wherein $R_6$ represents a fatty hydrocarbon radical and preferably an alkyl or alkenyl radical $C_8$ to $C_{22}$ such as lauryl, stearyl, oleyl, and polyamines and amidopolyamines of formula (IV)

$$R-X(C_nH_{2n})-NH_2 \quad (IV)$$

wherein X represents a divalent group of the formula $$-(CO)_r-NH+C_mH_{2m}-NH_{\overline{p}}$$

or

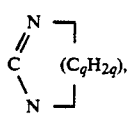

R is a hydrocarbyl radical and preferably alkyl or alkenyl having up to 22 carbon atoms, preferably $C_8$ to $C_{22}$, m and n, which can be identical or different, are integers of from 1 to 8, preferably from 1 to 6, p is a number taking whole values of 0 to 6, preferably 0 to 3, r is equal to 0 or 1 and q is an integer of from 2 to 10, preferably from 2 to 4.

In the mode of operation for which the cationic nitrogenized emulsifying agent includes one o several cationic nitrogenized emulsifying agents A associated with one or several cationic nitrogenized agents B such as generally defined above, the emulsifying agents A can be in particular selected among:

the monoamines of formula (III)
the diamines and amidoamines of formula (V)

$$R-(CO)_r-NH-(C_nH_{2n})-NH_2$$

the amines of formula (VI)

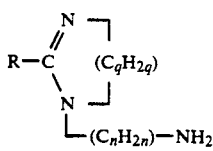

the quaternary ammonium compounds of formula (VII)

$$(R_7)_jN(R_8)_hY^- \quad (VII)$$

while the emulsifying agent B can in particular be selected among the polyamines or amidopolyamines of formula (VIII)

$$R-(CO)_r-NH+C_mH_{2m}-NH_{\overline{s}}(C_nH_{2n}-NH_2 \quad (VIII)$$

s representing in these formulae an integer from 1 to 6, preferably from 1 to 3, the $R_7$'s, which can be identical o different, designating $C_6$ to $C_{22}$ hydrocarbon radicals optionally replaced by one or several functional groups and preferably alkyl or alkenyl radicals from $C_8$ to $C_{22}$ or a benzyl radical, the $R_8$'s, identical or different, representing alkyl radicals from $C_1$ to $C_{66}$, eventually hydroxylated, preferably methyl, ethyl, propyl, hydroxyethyl, hydroxypropyl, $Y^-$ designating an anion of a mineral acid, in particular a chloride anion, or of an organic acid, preferably an acetate or formiate anion, h being a number equal to (4−j) and j being a number assuming the values 1, 2 or 3, while R, r, m, n and q have the meanings given above.

The preferred cationic nitrogenized emulsifying agents that can be used as emulsifying agents A have the following formulae $$R_9-(CO)_r-NH-(CH_2)_3-NH_2 \quad (IX)$$

$$R_9-(CO)_r-CH-(CH_2)_2-NH_2 \quad (X)$$
$$\qquad\qquad |$$
$$\qquad\qquad R_{10}$$

$$(R_9)_g(C_6H_5CH_2)\overset{+}{N}(R_{10})_lY_l^- \quad (XI)$$

$$(R_9)_j\overset{+}{N}(R_{10})_hY_l^- \quad (XII)$$

$R_9$ designating in these formulae an alkyl or alkenyl radical from $C_{12}$ to $C_{22}$, preferably stearyl and/or oleyl $R_{10}$ designating an alkyl or hydroxyalkyl radical from $C_1$ to $C_3$, $Y_1^-$ being a chloride or acetate anion, 1 being a number equal to (3−g) and g being a number assuming the values 1, 2 or 3 while r, j and h are numbers having the meanings given above.

Other preferred cationic nitrogenized emulsifying agents that can be preferably used as emulsifying compounds B correspond to the following formulae (XIII) and (XIV):

$$R_9+NH-(CH_2)_3\overline{\jmath}NH_2 \quad (XIII)$$

and $$R_9-CO+NH-(CH_2)_3\overline{\jmath}NH_2 \quad (XIV)$$

wherein f designates a number assuming the values 2, 3, 4 or 5 and $R_9$ has the above meaning.

The total quantity of cationic nitrogenized emulsifying agent in the emulsion can change widely. This quantity can advantageously represent from 0.03% to 3%, preferably from 0.06% to 2%, of the total weight of the emulsion for obtaining emulsions of quick rupture and satisfactory stability.

The acids used for adjusting the pH of the emulsion to a value of from 3 to 9 can be selected among the mineral acids of different degrees of acidity or also among the mono- or polycarboxylic acids, saturated or unsaturated, and eventually hydroxylated which are defined in French Patent No. 8,122,275 (publication No. 2,517,317) of Nov. 27, 1981. Preferred acids are hydrochloric, nitric, phosphoric, acetic, oxalic, citric and formic acids.

The bitumen-polymer binder reduced to cationic emulsion can be any one of the products obtained from bitumens to which have been added one or several polymers and eventually modified by this or these polymer(s) in the presence or absence of a reagent such as sulfur or an agent that releases sulfur such as a polysulfide, of a coupling or vulcanization agent, it being likewise possible to add to said bitumens, if necessary, a fluxing agent such as a petroleum fraction, a coal oil, or a mixture of said products.

Preferred bitumen/polymer binders can be selected among the different bitumen/polymer binders cited above by way of example.

The emulsion according to the invention can also include a thickening agent consisting of one or several water-soluble organic compounds, which, within a pH range of from 3 to 9, are capable of increasing the viscosity of the emulsion without modifying the viscosity of the aqueous phase above containing the cationic nitrogenized emulsifying agent.

Among the compounds that can be used as thickening agents, there can preferably be mentioned the water-soluble natural gums of the type guar gum, arabic gum, ghatti gum, karaya gum, tragacanth gum, locust bean gum, or also the water-soluble polyurethanes of low molecular weight, and in particular polyurethanes of molecular weight below 20,000 which result from the reaction of a polyisocyanate such as toluene diisocyanate, diphenyl methane 4,4'-diisocyanate, naphthylene 1,5-disocyanate, hexamethylene 1,6-diisocyanate, 3,3' tolidene - 4,4'diisocyanate and m-phenylene disulphonyl diisocyanate with polyols of the polyester polyol or polyether polyol type. As polyester polyols can be mentioned the reaction products of a polycarboxylic acid such as adipic, phthalic or maleic acid with a polyol or a mixture of polyols such as ethylene glycol, propylene glycol, diethylene glycol, butanediol, glycerol, trimethylol propane, hexamethylene triol and pentaerythritol, while appropriate polyether polyols can be selected among the reaction products of polyols of the ethylene glycol, propylene glycol, glycerol, trimethylol-propane, pentaerythritol, methyl glycoside, sorbitol and sucrose type with epoxides of the ethylene oxide, propylene oxide and epoxystyrene type.

The quantity of thickening agent in the emulsion can advantageously represent from 5% to 30% of the total weight of the combination formed by the cationic nitrogenized emulsifying agent, the carboxylated adjuvant and the thickening agent.

The cationic emulsions according to the invention are prepared by making, in a zone of emulsion formation, particularly in an apparatus of the emulsifier type, a homogeneous dispersion of the bitumen/polymer binder in an aqueous phase containing, in quantities adequate for obtaining the concentrations defined above, the emulsifying agent salified by an acid in an amount sufficient for obtaining the desired pH value, the water-soluble carboxylated sequestering compound and eventually the thickening agent. To do this, there are separately and simultaneously brought to the zone of formation of the emulsion, on one side, the bitumen/polymer binder in the form of a molten mass having a temperature comprised between 80° C. and 180° C., preferably between 120° C. and 160° C., and on the other, the aqueous phase containing the above mentioned ingredients and having a temperature between 15° C. and 80° C., preferably between 20° C. and 60° C., and the combination is maintained in said zone for a time sufficient for forming an emulsion.

The aqueous phase, which is mixed with the bitumen/polymer binder in the zone of formation of the emulsion, is prepared by introducing the emulsifying agent, the carboxylated sequestering compound, the acid and the eventual thickening agent in the amount of water necessary for producing the emulsion, which has been previously brought to a temperature comprised between 30° and 75° C. The quantities of emulsifying agent, of carboxylated sequestering compound and of eventual thickening agent which are added to the water are selected in a manner such that the concentrations of said ingredients in the resulting emulsion be within the above defined ranges. The acid is used in a quantity sufficient for transforming, if necessary, the cationic emulsifying agent into a soluble salt and for bringing the pH of the emulsion to the selected value. The ingredients namely, cationic nitrogenized emulsifying agent, carboxylated sequestering compound, acid and thickening agent, can be added to the water in any order. The carboxylated sequestering compound in particular can be introduced in the water before or after salification of the emulsifying agent by the acid. The carboxylated sequestering compound can likewise be formed in situ in the water from the corresponding precursor carboxylic acid and from a base apt to furnish salifying groups M such as defined above.

In an advantageous form of preparation, at least the emulsifying agent and the carboxylated sequestering compound, or the carboxylic acid precursor thereof, are simultaneously incorporated into the water in the form of a mixture called cationic emulsifying system which has been previously made, the acid is then added and the thickening agent if it is used.

The cationic emulsifying system includes, therefore, a cationic nitrogenized emulsifying agent consisting of one or more cationic nitrogenized emulsifying agents and an adjuvant consisting of at least one water-soluble carboxylated sequestering compound such as defined above or the carboxylic acid precursor thereof, said adjuvant being in particular formed of at least one carboxylated compound selected among the compounds of formula (I) or the carboxylic acid precursors thereof of formula (II).

In such an emulsifying system the weight of the cationic nitrogenized emulsifying agent represents in particular form 10 to 99%, preferably from 25 to 90%, of the total weight of emulsifying agent and adjuvant.

The cationic nitrogenized emulsifying agent present in the cationic emulsifying system can consist preferably of one or more of the cationic nitrogenized emulsifying agents selected among the fatty monoamines of formula (III) and the polyamines and amidopolyamines of formula (IV).

In a preferred manner of preparation, the cationic nitrogenized emulsifying agent of the cationic emulsifying system is constituted by the association of one or more cationic nitrogenized emulsifying agents A with one or more cationic nitrogenized emulsifying agents B such as defined above, the weight ratio of the total amount of the compound or compounds A to the total amount of compounds A and B being in particular from 5 to 95%.

In particular the compounds A can be selected among the compounds defined above by formulae (III), (V), (VI) and (VII) and preferably among the compounds A defined by formulae (IX), (X), (XI) and (XII), while the B compounds can be selected among the compounds defined above by the formula (VIII) and preferably among the compounds B defined by the formulae (XIII) and (XIV).

The cationic emulsifying system can also contain a thickening agent consisting of one or more water-soluble organic compounds selected among those defined above, and in particular among the water-soluble natural gums or among the water-soluble polyurethanes of low molecular weight and specially those resulting from the reaction between a polyisocyanate and a polyol of the polyester polyol or polyether polyol type.

The weight of thickening agent in the cationic emulsifying system advantageously represents from 5% to 30% of the total weight of the mixture comprising the emulsifying agent, the carboxylated adjuvant and the thickening agent.

In the preparation of the emulsion, the aqueous phase containing the cationic nitrogenized emulsifying agent, the carboxylated adjuvant, the acid and the thickening agent, on one hand, and the bitumen/polymer binder, on the other, are brought to the zone of formation of emulsion in proportions such that the cationic emulsion resulting advantageously contains by weight from 30 to 85%, preferably from 50 to 80%, of bitumen/polymer binder.

The cationic emulsions of bitumen/polymer binder according to the invention are characterized by a quick and irreversible rupture upon contact with the aggregates at the end of which the bitumen/polymer binder immediately and entirely recovers it initial properties.

The emulsions according to the invention are particularly suited to applications of road building and repair, to caulking in civil engineering or in construction and also to industrial uses.

The invention is illustrated by the examples that follow.

In these examples, which describe cationic emulsions of bituminous binders prepared according to the prior art (control examples) and according to the invention, the quantities appearing below are given to characterize the samples of emulsion prepared:

medium diameter of the globular distribution of the bituminous binder, that is, the value of the diameter corresponding to the value of 50% on the curve of cumulative granulometric particle-size distribution of the globules of the bituminous binder obtained by laser granulometric analysis;

index of rupture in fine siliceous products (abbreviated IR) determined according to the French standard NF T 66 017 and representing the minimum quantity, expressed in grams of siliceous sand of granulometry from 40 to 150 μm, entailing the rupture of 100 g of emulsion with formation of a bituminous clot sand-/binder (a value of the rupture index of about 80 corresponding to a quick rupture of the emulsion, which is what is sought);

time of rupture of the emulsion on plates of bituminous coatings with the aid of microdorite fine gravel having a diameter of from 10 to 14 mm (on a surface formed by a bituminous coating the emulsion is placed, thereafter said emulsion is coated by means of fine gravel, and there is counted from the time the emulsion is covered by the fine gravel, the time that elapses until the rupture of the emulsion, which appears by an attachment of the fine gravel to the support).

Besides, the following characteristics have likewise been determined in the course of the evaluation test of the rupture index:

quantity of liquid salted out after obtention of the clot of fine sands coated by the bituminous binder ruptured and content of water of this liquid (a small amount of liquid containing an elevated amount of water resulting in a quick and open rupture of the emulsion); and cohesion/elasticity of the clot of fine sands coated by the bituminous binder since the formation of said clot, determined by traction test according to the French standard NF T 46 002.

The composition of the liquid, that is, of the water-/emulsion phase salted out during the rupture of the emulsion, objectively shows the quantity of non-ruptured emulsion, this information being related to the phenomenon of delay or arrest in the rupture of the emulsion. A small amount of liquid containing an elevated amount of water corresponds to a quick and open rupture of the emulsion whereas a larger amount of liquid containing a small amount of water shows a slow rupture of the emulsion, which is what has to be prevented.

The immediate cohesiveness or elasticity of the clot of fine siliceous sands coated with bituminous binder is a characteristic that accounts for the coalescence of the mass of globules of the ruptured bituminous binder, and that gives an indication of the capacity of the bituminous binder to recover its initial viscoplastic or elastomeric properties.

The emulsions described in the examples have been prepared using, as the case may be, either city water having a total hardness corresponding to a hydrotimetric standard equal to 22° or an industrial water having a total hardness corresponding to a hydrotimetric standard of 24° and containing 15 mg per liter of ferrous ions.

In the examples given below the quantities and percents are given by weight unless otherwise indicated.

EXAMPLE 1

In this example, which is a control example, there was prepared a cationic emulsion at 70% of a bituminous binder consisting of an ordinary bitumen of 180/220 penetration, as follows.

There was formed in the first place an aqueous phase consisting of an aqueous solution of hydrochloride of the emulsifying agent, producing a 0.16% dispersion of propylene diamine-1,3 of tallow (cationic nitrogenized emulsifying agent) in industrial water, thereafter adding to the dispersion 0.14% hydrochloric acid at 20° Be (d=1.16).

The emulsion was then produced in an emulsifier in which there were simultaneously and separately introduced 300 parts of the aqueous phase prepared as indicated above and brought to 45° C., and 700 parts of the bitumen brought to 145° C.

There were obtained 1000 parts of a control cationic emulsion the characteristics of which are given below:

| | |
|---|---|
| pH: | 3.5 |
| medium diameter of the bituman globules (μm): | 3–5 |
| index of rupture: | 70 |
| amount of salted out liquid after 1 hour (% of the emulsion): | 6 |
| amount of water in the salted out liquid (%): | 95 |
| cohesiveness of the clot: | good |
| rupture time of the emulsion on coated plates (mn): | about 30 |

The amount of salted out liquid is small, and it is essentially water. The time of rupture of the emulsion on coated plate is about 30 minutes for a rupture index of 70. The cationic emulsion thus produced has a behavior deemed satisfactory with regard to the rupture phenomenon.

EXAMPLE 2

In this example, which represents a second control example, there were prepared three cationic emulsions (tests I, II and III) at 70% of a bituminous binder of the bitumen/polymer type constituted by a reaction product at elevated temperature of a road bitumen of 80/100 penetration with a mother solution consisting of a solution of sulfur and a block copolymer of styrene and butadiene containing 25% styrene and 75% butadiene in a petroleum fraction obtained in refinery after catalytic cracking of the heavy distillates called "Light Cycle Oil", said fraction having a distillation range on the order of from 180° C. to 360° C.

For preparing the bitumen/polymer binder, the work was carried out as follows. Twenty parts of block copolymer were dissolved in 80 parts of the petroleum fraction at a temperature comprised between 80° C. and 100° C. After the polymer was completely dissolved, 0.6 part of sulfur was added to the solution. Fifteen parts of the solution thus prepared were mixed with 85 parts of the road bitumen and the mixture was brought to a temperature comprised between 170° C. and 180° C. for about 1 5 hours. There was thus obtained a bitumen/polymer binder, the main characterics of which are indicated herebelow.

| | |
|---|---|
| Viscosity at 160° C.: | 89 mPa.s |
| pseudo-viscosity at 50° C. with an orifice of 10 mm (NF T 66005): | 115 seconds |
| traction test at −10° C. with a speed of 500 mm/mn | |
| Stress at threshold ($\gamma s$): | $5.7 \times 10^5$Pa |
| Stress at breakage ($\gamma r$): | $1.07 \times 10^5$Pa |
| Elongation at threshold ($\epsilon s$): | 20% |
| Elongation at breakage ($\epsilon r$): | >900% |

The bitumen polymer binder was emulsified using the mode of operation that follows.

There was first formed an aqueous phase consisting of an aqueous solution of the hydrochloride of the emulsifying agent by dispersing tallow propylene diamine −1,3 (cationic nitrogenized emulsifying agent) in industrial water, then adding to the dispersion an adequate amount of hydrochloric acid at 20° Be.

Expressed in percents of the aqueous phase, the amounts of emulsifying agent and of hydrochloric acid used respectively represented 0.15% and 0.14% for test I, 0.25% and 0.21% for test II and 0.08% and 0.06% for test III.

The emulsion was then produced in an emulsifier in which were simultaneously and separately introduced 300 parts of the aqueous phase prepared as indicated above and brought to 45° C. and 700 parts of the bitumen/polymer binder brought to 145° C.

There were obtained in each test 1000 parts of the control cationic emulsion, the characteristics of which are given herebelow.

| Test: | I | II | III |
|---|---|---|---|
| pH: | 3.5 | 4 | 4.2 |
| medium diameter of the globules of binder (μm): | 3–5 | 3–5 | 3–6 |
| rupture index: | 50 | 80 | 40 |
| quantity of salted out liquid after 1 hour (% of the emulsion): | 35 | 21 | 45 |
| quantity of water in the salted out liquid (%): | 32 | 60 | 32 |
| cohesiveness of the clot: | zero | zero | zero |
| time of rupture of the emulsion on plates on coated products (mn): | >180 | >180 | >180 |

In the three tests all the bitumen/polymer binder is emulsified and the cationic emulsions produced have a good stability in storage.

On the other hand, although in the three emulsions the values of the index of rupture were from quick to very quick ruptures, the quantity of salted out liquid in the test for determining said index is considerable and this liquid contains a high rate of non-ruptured emulsions. Besides, the clot of the mixture of sand and bitumen/polymer binder formed after rupture of the emulsion shows no cohesiveness and in addition the time of rupture of the emulsion on plates of coated material is considerable in each case.

EXAMPLES 3 to 5

In these examples cationic emulsions according to the invention were prepared with 70% of a bituminous binder of the bitumen/polymer type identical with the one described in Example 2.

The bitumen/polymer binder was emulsified using the mode of operation that follows.

There was first formed an aqueous phase consisting of an aqueous solution of the hydrochloride of the emulsifying agent by producing a dispersion of the emulsifying agent in industrial water (Example 3) or in city water (Examples 4 and 5), and then adding to the dispersion, counted in percents of the aqueous phase, 0.13% of hydrochloric acid of 20° Be, then 0.2% of an aqueous solution with 40% dipotassium salt of N-(hydroxy-2-ethyl) glycine acid (Examples 3 and 4) or the potassium salt of the acid N,N-di(hydroxy-2-ethyl) glycine (Example 5).

The emulsifying agent used consisted of a mixture of tallow propylene-1,2 diamine (emulsifying agent of type A) and of a tallow polypropylene polyamine sold under the name of LILAMULS EM30 (emulsifying agent of type B) in quantities respectively representing, in percents of the aqueous phase, 0.015% and 0.135% in Examples 3 and 4, and 0.16% and 0.02% in Example 5. The aqueous phase obtained in each case was limpid.

The emulsion was then produced in an emulsifier in which there were simultaneously and separately introduced 300 parts of the aqueous phase prepared as indicated above and brought to 45° C. and 700 parts of the bitumen/polymer binder brought to 145° C.

In each example there were obtained 1000 parts of cationic emulsions, the characteristics of which are given herebelow.

| Example | 3 | 4 | 5 |
|---|---|---|---|
| pH: | 5.5 | 5.3 | 5.1 |
| medium diameter of the binder globules (μm): | 3–6 | 3–6 | 3–6 |
| rupture index: | 60 | 60 | 65 |
| amount of liquid salted out after 1 hour (% of the emulsion): | 8 | 6 | 6 |
| amount of water in the salted out liquid (%): | 98 | 98 | 97 |
| cohesiveness of the clot: | strong elasticity | strong elasticity | strong elasticity |
| time of rupture of the emulsion | 30–60 | 30–60 | 30–60 |

For the three examples all the bitumen/polymer binder was emulsified and the stability in storage of the emulsions produced is good.

The rupture indices of the emulsions are low, and there was found a behaviour of the emulsions similar to that of an ordinary bitumen emulsion, namely, small amount of salted out liquid phase and small amount of non-ruptured emulsion.

Besides, the clot of sand and bitumen/polymer obtained in the course of the test for determining the rupture index showed a strong cohesiveness-elasticity and can be subjected to a characterization by traction test.

Herebelow are given the traction characteristics of the clot resulting from the rupture of the emulsion of Example 3 in the course of the test for determining the rupture index, the traction test having been carried out according to the standard NF T 46 002, working at 0° C. with a traction speed of 500 mm/mn.

Sress at threshold:$2.6 \times 10^5$Pa
Stress at breakage:$0.71 \times 10^5$Pa
Elongation at threshold:14%
Elongation atbreakage:590%

EXAMPLE 6

There was prepared a cationic emulsion of a bituminous binder of the bitumen/polymer type obtained as described in Example 2, but replacing the petroleum fraction "Light Cycle Oil" by the same amount of an anthracenic coal oil having a distillation range on the order of from 200° to 400° C.

The emulsion was prepared as follows:

There was first formed an aqueous dispersion of emulsifying agent by dispersing in industrial water a mixture of cationic nitrogenized emulsifying agents consisting of stearic propylene amidoamine (emulsifying agent of type A) and a alkyl amidopolyamine sold under the name of EMULSAMINE L 60 (emulsifying agent of type B), said emulsifying agents being used in amounts respectively representing 0.02% and 0.15% of the aqueous dispersion. There were then introduced into the dispersion, expressed in percents of the latter, 0.2% of an aqueous solution with 40% of potassium salt of N,N- bis (hydroxy-2-ethyl) glycine acid and then 0.25% of an acetic acid solution at 96% (density=1.06). There was obtained a limpid aqueous phase.

In the emulsifier there were separately and simultaneously introduced 300 parts of the aqueous phase prepared as indicated above and brought to 45° C. and 700 parts of the bitumen/polymer binder brought to 145° C.

There were obtained 1000 parts of cationic emulsion having the characteristics given herebelow.

| | |
|---|---|
| pH: | 5.3 |
| medium diameter of the globules of binder (μm): | 3-7 |
| rupture index: | 60 |
| quantity of liquid salted out after 1 hour (% of emulsion): | 7 |
| quantity of water in the salted out liquid (%): | 98 |
| cohesiveness of the clot: | strong elasticity |
| time of rupture of the emulsion on plates of coated product (mn): | 30-60 |

The whole binder is emulsified and the stability in storage of the emulsion produced is good.

The rupture index of the emulsion is low and the rupture of the emulsion is accompanied by the salting out of a reduced amount of liquid containing little of the non-ruptured emulsion. Besides, the clot of sand and bitumen/polymer binder obtained in the course of the test for determining the index of rupture has a strong cohesiveness-elasticity.

EXAMPLE 7

There was prepared a cationic emulsion of a bituminous binder of the bitumen/polymer type obtained by mixing a road bitumen of 80/100 penetration with a ethylene/vinyl acetate copolymer containing 45% vinyl acetate The binder was prepared by dispersing, by stirring and for about 2 hours, 50 parts of the copolymer in 950 parts of the bitumen brought to 180° C., then fluidizing the homogeneous solution obtained by adding 10% of an anthracenic coal oil having a distillation range on the order of from 200° to 300° C.

The main characteristics of the binder obtained are indicated herebelow:

| | |
|---|---|
| viscosity at 160° C.: | 97 mPa.s |
| pseudo-viscosity at 50° C. with an orifice of 10 mm (NF T 66 005): | 128 seconds |
| traction test at −10° C. with a speed of 500 mm/mn | |
| Stress at threshold: | $12.3 \times 10^5$Pa |
| Stress at breakage: | $6,3 \times 10^5$Pa |
| Elongation at threshold: | 15% |
| Elongation at breakage: | 320% |

The binder was emulsified by following the mode of operation described in Example 6.

There were obtained 1000 parts of cationic emulsion of bitumen/polymer binder having the characteristics given herebelow.

| | |
|---|---|
| pH: | 5.4 |
| medium diameter of the globules of binder (μm): | 3-6 |
| rupture index: | 62 |
| quantity of liquid salted out after 1 hour (% of emulsion): | 7 |
| quantity of water in the salted out liquid (%): | 99 |
| cohesiveness of the clot: | strong cohesiveness |
| time of rupture of the emulsion on plates of coated product (mn): | 30-60 |

All of the binder is emulsified during the preparation of the emulsion and the stability in storage of the emulsion produced is good.

The rupture index of the emulsion is low and the rupture of the emulsion is accompanied by the salting out of a reduced amount of liquid containing very little of the non-ruptured emulsion. Additionally, the clot of sand and bitumen/polymer binder obtained in the course of the test for determining the rupture index has a strong cohesiveness.

EXAMPLE 8

There were prepared two cationic emulsions of a bituminous binder of the bitumen/polymer type obtained by mixing a road bitumen of penetration 80/100 with a stellate triblock copolymer styrene/butadiene/styrene sold under the name of SOLPRENE 411 by PHILLIPS PETROLEUM.

The binder was prepared by dispersing, by stirring for 2 hours, three parts of the copolymer in 100 parts of the bitumen brought to 180° C., then fluidizing the homogeneous solution obtained by adding 12% of a petroleum fraction of the "Light Cycle Oil" type having a range of distillation of from 180° C. to 360° C.

The main characteristics of the binder obtained are given herebelow:

| | |
|---|---|
| viscosity at 160° C.: | 102 mPa.s |
| pseudo-viscosity at 50° C. with an orifice of 10 mm (NF T 66005): | 132 seconds |
| traction test at −10° C. with a traction speed of 500 mm/mn | |
| Stress at threshold: | $7.1 \times 10^5$Pa |
| Stress at breakage: | $0.05 \times 10^5$Pa |
| Elongation at threshold: | 20% |
| Elongation at breakage: | 800% |

The bitumen/polymer binder was emulsified by making use either of the procedure of Example 6 according to the invention (test 8.I) or of the procedure of the control Example 2 (test 8.II).

In each case there were obtained 1000 parts of a cationic emulsion of the bitumen/polymer binder having the characteristic stated herebelow:

| test: | 8.I | 8.II |
|---|---|---|
| pH: | 5.6 | 3.8 |
| medium diameter of the globules of binder (μm): | 4–7 | 3–6 |
| rupture index: | 60 | 65 |
| quantity of salted out liquid after 1 hour (% of the emulsion): | 8 | 34 |
| quantity of water in the salted out liquid (%): | 96 | 34 |
| cohesiveness of the clot: | strong elasticity | zero |
| time of rupture of the emulsion on plates on coated products (mn): | 30–60 | >180 |

In each one of the tests all of the binder was emulsified during the preparation of the emulsion and the stability in storage of the emulsion produced is good.

For the emulsion of test 8.I according to the invention the rupture index of the emulsion is low and the rupture of the emulsion is accompanied by salting out of reduced amount of liquid containing very little of non-ruptured emulsion. Besides, the clot of sand and bitumen/polymer binder obtained in the course of the test for determining the rupture index has a strong elasticity.

The traction characteristics of this clot obtained by traction test following the standard NF T 46002 working at 0° C. with a traction speed of 500 mm/mn are the following:

Stress at threshold: $3 \times 10^5$Pa
Stress at breakage: $0.3 \times 10^5$Pa
Elongation at threshold: 15%
Elongation at breakage: 170%

For the control emulsion of test 8.II, the rupture index has a value approximate to that of the emulsion of test 8.I, but the rupture of the emulsion is accompanied by the salting out of a considerable amount of liquid containing a great proportion of non-ruptured emulsion. In addition, the clot of sand and bitumen/polymer binder obtained in the course of the test for determining the rupture index has no cohesiveness at all. Finally, the time of rupture of the emulsion on plates of coated products is much longer than that measured for the emulsion of test 8.I according to the invention.

EXAMPLE 9

A bituminous binder of the bitumen/polymer type was prepared by mixing 80 parts of a road bitumen of penetration 80/100 brought to 180° C. with 20 parts of a vulcanized mother solution formed from a hydrocarbon solvent, a block copolymer of styrene and butadiene and sulfur as indicated in French Patent 7,910,987 (Publication No. 2,455,623) of May 2, 1979.

The bitumen/polymer binder obtained had the following characteristics:

| | |
|---|---|
| viscosity at 160° C.: | 60 mPa.s |
| pseudo-viscosity at 50° C. with an orifice of 10 mm (NF T 66 005): | 78 seconds |
| traction test at 0° C. with a traction speed of 500 mm/mn | |
| Stress at threshold: | $2.55 \times 10^5$Pa |
| Stress at breakage: | $0.14 \times 10^5$Pa |
| Elongation at threshold: | 15% |
| Elongation at breakage: | 900% |

From the bitumen/polymer binder thus obtained, there were prepared two cationic emulsions by making use either of the procedure of Example 6 (test 9 I) or of the procedure of the control Example 2 (test 9.II)

In each case there were obtained 1000 parts of a cationic emulsion of the bituminous binder of the bitumen/polymer type having the following characteristics:

| test: | 9.I | 9.II |
|---|---|---|
| pH: | 5.6 | 3.6 |
| medium diameter of the globules of binder (μm): | 3–6 | 3–6 |
| rupture index: | 57 | 59 |
| quantity of liquid salted out after 1 hour (% of the emulsion): | 4 | 38 |
| quantity of water in the salted out liquid (%): | 96 | 34 |
| cohesiveness of the clot: | good cohesiveness | zero |
| time of rupture of the emulsion on plates on coated products (mn): | 30–60 | >180 |

In each one of the tests all of the binder is emulsified during the preparation of the emulsion and the stability in storage of the emulsion obtained is good.

For the emulsion of test 9.I according to the invention the rupture index of the emulsion is low and the rupture of the emulsion is accompanied by salting out of a reduced amount of liquid containing very little of non-ruptured emulsion. Additionally, clot of sand and bitumen/polymer binder obtained in the course of the test for determining the rupture index has a good cohesiveness.

The traction characteristics of this clot obtained by traction test according to standard NF T 46002, working at 10° C. with a traction speed of 500 mm/mn are the following:

Stress at threshold: $3.3 \times 10^5$Pa
Stress at breakage: $0.28 \times 10^5$Pa Elongation at threshold: 10%
Elongation at breakage: 25%

For the control emulsion of test 9.II, the rupture index has a value comparable to that of the emulsion of test 9.I, but the rupture of the emulsion is accompanied by salting out of a considerable amount of liquid containing a substantial proportion of non-ruptured emulsion. Besides, the clot of sand and bitumen/polymer binder obtained in the course of the test for determining the rupture index has no cohesiveness at all. Finally, the time of rupture of the emulsion on plates of coated product is much longer than that measured for the emulsion of test 9.I according to the invention.

EXAMPLE 10

From the bitumen/polymer binder obtained as described in Example 2, there was prepared a cationic emulsion according to the invention with 70% of said binder following the mode of operation defined in Example 5, but with two modifications, namely, the use by way of emulsifying agent of a mixture of dimethyl benzyl ammonium tallow chloride sold under the name of NORAMIUM S 75 by the firm CECA and of tallow polypropylene polyamine (LILAMULS EM 30) in respective quantities representing 0.17% and 0.1% of the aqueous phase, and the use of an amount of hydrochloric acid representing only 0.1% of the aqueous phase.

There were obtained 1000 parts of cationic emulsion having the following characteristics:

| | |
|---|---|
| pH: | 5.5 |
| medium diameter of the globules of binder ($\mu$m): | 3–6 |
| rupture index: | 55 |
| quantity of liquid salted out after 1 hour (% of the emulsion): | 12 |
| quantity of water in the salted out liquid (%): | 95 |
| cohesiveness of the clot: | great elasticity |
| time of rupture of the emulsion on plates on coated products (mn): | 30–60 |

All of the bitumen/polymer binder was emulsified and the stability in storage of the emulsion produced is good.

The rupture index of the emulsion is low and there is found a behavior of the emulsion similar to that of an ordinary bitumen emulsion, namely, small amounts of salted out liquid phase and little of non-ruptured emulsion.

Besides, the clot of sand and bitumen/polymer binder obtained in the course of the test for determining the rupture index has a strong cohesiveness-elasticity characterized by traction test.

EXAMPLE 11

From the bitumen/polymer binder obtained as described in Example 2, there was prepared a cationic emulsion according to the invention with 70% of said binder as follows.

There was first formed a mixture of 45 parts of dimethyl benzyl ammonium tallow chloride (NORAMIUM S 75), 25 parts of tallow polypropylene polyamind (LILAMULS EM 30), 25 parts of an aqueous solution with 40% potassium salt of N,N-di(hydroxy-2--ethyl) glycine acid and 67 parts of an aqueous solution with 30% of a thickening agent consisting of arabic gum.

An aqueous phase was prepared by incorporating 0.4 part of the mixture thus produced into 100 parts of city water and then adding to the dispersion 0.1 part of hydrochloric acid at 20° Be.

The emulsion was then produced in an emulsifier in which were simultaneously and separately introduced 300 parts of the aqueous phase prepared as indicated above and brought to 45° C. and 700 parts of the bitumen/polymer binder brought to 145° C.

The cationic emulsion obtained had characteristics similar to those of the cationic emulsion obtained in Example 10 although its viscosity was higher, namely, above 110 centistokes.

All of the bitumen/polymer binder was emulsified and the stability in storage of the emulsion produced was good.

We claim:

1. Cationic emulsions of bituminous binders selected from the group consisting of (a) a bitumen having at least one polymer added thereto, (b) a bitumen modified by at least one polymer, (c) a bitumen modified by at least one polymer in the presence of at least one of sulfur and an agent releasing sulfur, (d) mixtures of said bitumens and (e) mixtures of at least one of said bitumens with a fluxing agent, selected from the group consisting of a petroleum fraction, a coal oil and a mixture thereof, which emulsions are formed from a dispersion of an organic phase comprised of at least one of said bitumens in an aqueous phase containing a cationic nitrogen containing emulsifying agent and an acid, said acid being present in a quantity such that the pH of said aqueous phase has a value of from about 3 to about 9; and wherein said aqueous phase contains an adjuvant consisting of at least one water-soluble sequestering salt of a polyfunctional nitrogen-containing carboxylic acid which displays substantially no emulsifying properties and has a sequestration power in respect to the metallic ions equivalent, in a pH range of from about 3 to about 9 to a fixation of at least 5 mg calcium ions per gram of salt.

2. Emulsions according to claim 1, wherein said salt or salts of polyfunctional nitrogen-containing carboxylic acid constituting said adjuvant have the formula:

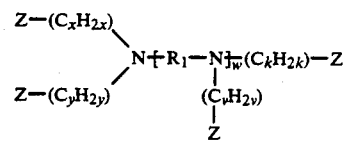

wherein the Z's can be identical or different and represent a radical selected from the group consisting of —OH, —COOH and —COOM radicals with at least one Z designating a —COOM radical, the symbols x, y, v and k can be identical or different integers of from 1 to 6, w is a number having the whole values of 0 to 3, $R_1$ is a hydrocarbylene bivalent radical, of from $C_1$ to $C_8$, which can be substituted with one or more functional groups and the symbol M can be different from one group to the other and represents an atom of alkaline metal, an $+NH_5 -NH_2$ radical, or a radical of the formula

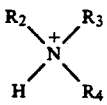

wherein the symbols R₂ through R₄, which can be identical or different, each represents one hydrogen atom or a hydrocarbyl monovalent radical of $C_1$ to $C_8$, and which may include one or several functional groups, some of R₂ to R₄ radicals can be combined to form a heterocycle with the nitrogen atom to which they are bonded.

3. Emulsions according to claim 2 wherein said R₁ is an alkylene radical of from $C_2$ to $C_4$ and said alkaline metal atom is sodium or potassium.

4. Emulsions according to claim 2, wherein said functional group is an OH group.

5. Emulsions according to claim 2 wherein the hydrocarbyl radicals that can be represented by the symbols R₂ to R₄ are alkyl or hyroxyalkyl radicals from $C_1$ to $C_8$, cycloalkyl radicals from $C_4$ to $C_8$ or aromatic radicals from $C_6$ to $C_8$, and some of said radicals R₂ to R₄ being capable of forming an aromatic or alicyclic heterocyclic group with the nitrogen atom to which they are bonded.

6. Emulsion according to claim 5 wherein some of said R₂-R₄ radicals form a pyridine or piperidine group with the nitrogen atom to which they are bonded.

7. Emulsions according to claim 2 wherein the salt or salts of polyfunctional nitrogen-containing carboxylic acid which constitute the adjuvant have the formulae

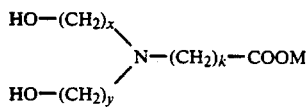

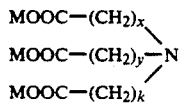

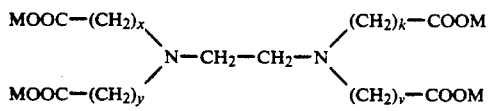

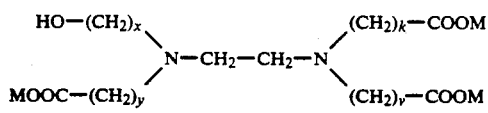

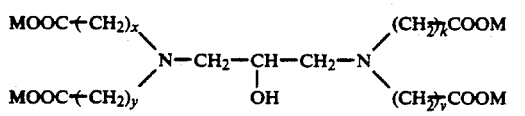

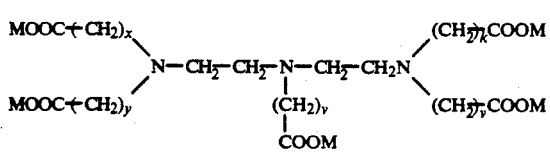

wherein x, y, v and k designate identical or different integers from 1 to 6, and M represents a sodium or potassium atom or a radical —NH₃—NH₂.

8. Emulsions according to claim 1 wherein the concentration of the carboxylated adjuvant in the aqueous phase of the emulsion is from 0.005% to 0.5% by weight of the emulsion.

9. Emulsions according to claim 8 wherein the concentration of said carboxylated adjuvant is from about 0.1% to about 0.3% by weight of the emulsion.

10. Emulsions according to claim 1 wherein the cationic nitrogen-containing emulsifying agent present in the emulsion consists of at least one cationic nitrogen-containing emulsifying agent selected from the group consisting of the fatty monoamines, polyamines, amidoamines, amidopolyamines, salts or oxides of said amines and amidoamines, and of reaction products of said compounds with ethylene oxide and/or propylene oxide.

11. Emulsions according to claim 1 wherein the cationic nitrogenized emulsifying agent present in the emulsion consists of at least one cationic nitrogenized emulsifying agent selected from the group consisting of the fatty monoamines of the formula R₆—NH₂, wherein R₆ is a fatty hydrocarbon radical and an alkyl or alkenyl radical from $C_8$ to $C_{22}$ and the polyamines or amidopolyamines of the formula $$R-X-(C_nH_{2n})-NH_2$$

wherein X is a divalent group having the formula

or

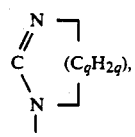

R is a hydrocarbyl radical, having up to 22 carbon atoms, m and n, are identical or different, and are integers from 1 to 8, p has a value of from 0. to 6, r is equal to 0 or 1 and g is an integer from 2 to 10.

12. Emulsions according to claim 11 wherein R is alkyl or alkenyl of from $C_8$ to $C_{22}$; m and n are integers of from 1 to 6; p has a value of from 0 to 3; and g is an integer of from 2 to 4.

13. Emulsions according to claim 1 wherein the cationic nitrogen-containing emulsifying agent present in the emulsion is formed by association of one or more cationic nitrogen-containing emulsifying agents A selected from the group consisting of the monoamines, diamines, amidoamines, oxides of said amines or amidoamines, reaction products of said compounds with propylene oxide and/or ethylene oxide and quaternary ammonium salts with one or more emulsifying agents B selected from the group consisting of the cationic nitrogen-containing emulsifying agents having in their molecule at least three functional groups selected from the amine and amide groups in a manner such that at least one of said functional groups is an amine group.

14. Emulsions according to claim 13, wherein the weight ratio of the total quantity of the compound or compounds A to the total quantity of A and B compounds is from 5% to 95%.

15. Emulsions according to claim 13 wherein the emulsifying agents A are selected from the group consisting of:

the monoamines of formula R$_6$—NH$_2$,
the diamines and amidoamines of formula R—(CO)$_r$—NH—(C$_n$H$_{2n}$)—NH$_2$
the amines of the formula

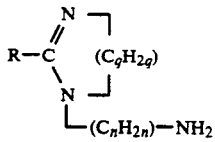

the quaternary ammonium compounds of the formula (R$_7$)$_j$N(R$_8$)$_h$Y$^-$ while the emulsifying agents B are selected among the polyamines and amidopolyamines of the formula

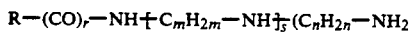

wherein R represents a hydrocarbyl radical, having up to 22 carbon atoms, and m and n, are identical or different, being integers from 1 to 8, r being equal to 0 or 1, g designating an integer from 2 to 10, s representing an integer from 1 to 6, the R$_7$'s, can be identical or different, and designate C$_6$ to C$_{22}$ hydrocarbyl radicals replaced by one or more functional groups, the R$_8$'s, can be identical or different, representing alkyl or hydroxyalkyl radicals from C$_1$ to C$_6$, Y$^-$ designating an anion of a mineral acid, or of an organic acid, h being a number equal to (4−j) and j representing a number assuming the values 1, 2 or 3.

16. Emulsions according to claim 13 wherein the emulsifying agents A are selected among the compounds of formulae:

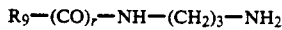

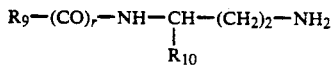

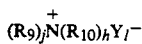

wherein R$_9$ designates an alkyl or alkenyl radical from C$_{12}$ to C$_{22}$, R$_{10}$ represents an alkyl or hydroxyalkyl from C$_1$ to C$_3$, Y$_{-1}$ is a chloride or acetate anion, l is a number equal to (3-g), g is a number having the values 1, 2 or 3, r is equal to 0 to 1, h is a number equal to (4-j) and j designates a number assuming the values 1, 2 or 3.

17. Emulsions according to claim 16 wherein R$_9$ represents stearyl or oleyl.

18. Emulsions according to claim 13 wherein the emulsifying agents B are selected among the compounds of the formula:

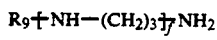

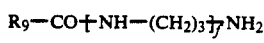

wherein f designates a number assuming the values 2, 3, 4 or 5 and R$_9$ represents an alkyl or alkenyl radical from C$_{12}$ to C$_{22}$.

19. Emulsions according to claim 18 wherein R$_9$ represents stearyl or oleyl.

20. Emulsions according to claim 1 wherein the total quantity of cationic nitrogen-containing emulsifying agent in the emulsions represents from 0.03% to 3% by weight of the emulsion.

21. Emulsions according to claim 56 wherein the total quantity of cationic nitrogen-containing emulsifying agent is from 0.06% to 2%.

22. Emulsions according to claim 1 wherein the acid used to control the pH of the emulsion is a mineral acid selected from the group consisting of hydrochloric, nitric or phosphoric, or a saturated or unsaturated mono- or polycarboxylic acid.

23. Emulsions according to claim 22 wherein said acid is selected from the group consisting of acetic, formic, oxalic and citric.

24. Emulsions according to claim 1 wherein they also contain in their aqueous phase a thickening agent consisting of one or more water-soluble organic compounds capable, within a pH range of from 3 to 9, to increase the viscosity of the emulsion without modifying the viscosity of the aqueous phase along.

25. Emulsions according to claim 24, wherein the thickening agent is a water-soluble natural gum.

26. Emulsions according to claim 24, wherein the thickening agent is a water-soluble polyurethane of low molecular weight which results from the reaction of a polyisocyanate with a polyester polyol or a polyether polyol.

27. Emulsions according to claim 24 wherein the weight of thickening agent in the emulsion represents from 5 to 30% of the total weight of the combination formed by the cationic nitrogen-containing emulsifying agent, the adjuvant and the thickener.

28. A cationic emulsifying system which contains a cationic nitrogen-containing emulsifying agent consisting of one or more cationic nitrogen-containing emulsifying agents and an adjuvant consisting of at least one water-soluble sequestering salt of a polyfunctional nitrogen-containing carboxylic acid or the acid precursor of said salt, said salt displaying substantially no emulsifying properties and having sequestration power in respect to the metallic ions that is equivalent, within the pH range of from 3 to 9, to a fixation of at least 5 mg of calcium ions per gram of salt.

29. An emulsifying system according to claim 28 characterized in that the salt or salts of polyfunctional nitrogen-containing carboxylic acid that constitute the adjuvant have the formula

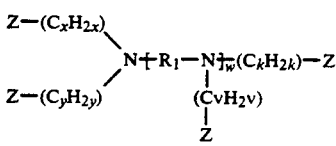

wherein z can be identical or different and represents a radical selected from the group consisting of —OH, —COOH and —COOM radicals with at least one Z designating a —COOM radical, the symbols x, y, v and k are identical or different integers from 1 to 6, w is a number assuming the integral values of 0 to 3, R$_1$ is a hydrocarbylene bivalent radical from C$_1$ to C$_8$ which can be substituted by one or more functional groups, and the symbol M, which can be different from one Z group to the other, represents an alkaline metal atom, a radical +NH$_3$—NH$_2$ or a radical of the formula

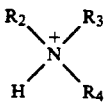

wherein the symbols $R_2$ to $R_4$, can be identical or different, and each represents a hydrogen atom or a hydrocarbyl monovalent radical from $C_1$ to $C_8$, which can contain one or more functional groups and wherein $R_2$ to $R_4$ can form a heterocycle with the nitrogen atom to which they are bonded.

30. An emulsifying system according to claim 29 wherein said $R_2$-$R_4$ are hydrocarbyl radicals of from $C_1$ to $C_6$ and said alkaline metal atom is sodium or potassium.

31. An emulsifying system according to claim 28 wherein the hydrocarbyl radicals that can represent the symbols $R_2$ to $R_4$ are alkyl or hydroxyalkyl radicals from $C_1$ to $C_8$, cycloalkyl radicals from $C_4$ to $C_8$, or aromatic radicals from $C_6$ to $C_8$, and wherein some of the $R_2$ to $R_4$ radicals can form an aromatic or alicyclic heterocycle, selected from the group of pyridinic, or piperidinic, with the nitrogen atom to which they are bonded.

32. An emulsifying system according to claim 28, wherein the salt or salts of polyfunctional nitrogen-containing carboxylic acid that constitute the adjuvant have the formulae:

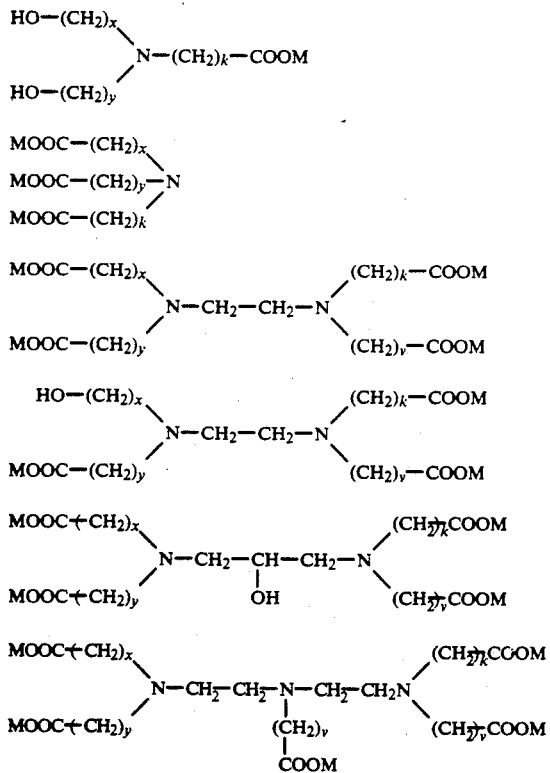

wherein x,y,v and k designate identical or different integers from 1 to 6, and M represents a sodium or potassium atom or an —$NH_3$ —$NH_2$ radical.

33. An emulsifying system according to claim 28 wherein the weight of cationic nitrogen-containing emulsifying agent present represents from 10 to 99%, of the total weight of emulsifying agent and adjuvant.

34. An emulsifying system according to claim 28 wherein the emulsifying agent represents from 25 to 90% of the total weight of emulsifying agent and adjuvant.

35. An emulsifying system according to claim 28 wherein the cationic nitrogen-containing emulsifying agent consists of one or more cationic nitrogen-containing emulsifying agents selected from the group consisting of the fatty monoamines, of the polyamines, amidoamines, amidopolyamines, salts or oxides of said amines and amidoamines and of reaction products of said compounds with ethylene and/or propylene oxide.

36. An emulsifying system according to claim 28 wherein the cationic nitrogenized emulsifying agent consists of one or more cationic nitrogenized emulsifying agents selected from the group consisting of the fatty monoamines of the formula $R_6$—$NH_2$, wherein $R_6$ represents a fatty hydrocarbon radical selected from an alkyl or alkenyl radical from $C_8$ to $C_{22}$ and the polyamines and amidopolyamines of the formula $$R-X-(C_nH_{2n})-NH_2$$

wherein X represents a bivalent group of the formula

or

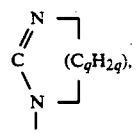

wherein R is a hydrocarbyl radical, having up to 22 carbon atoms, m and n, can be identical or different, and are integers from 1 to 8, p has a value of from 0 to 6, r is equal to 0 to 1 and g is an integer from 2 to 10.

37. An emulsifying system according to claim 36 wherein R is alkyl or alkenyl of from $C_8$ to $C_{22}$; m and n are integers of from 1 to 6; p has a value of from 0 to 3; and g is an integer of from 2 to 4.

38. An emulsifying system according to claim 28 wherein the cationic nitrogen-containing emulsifying agent is formed by association of one or more cationic nitrogen-containing emulsifying agents A selected from the group consisting of monoamines, diamines, amidoamines, oxide of said amines or amidoamines, reaction products of said compounds with ethylene and/or propylene oxide and quaternary ammonium salts with one or more emulsifying agents B which are cationic nitrogen-containing emulsifying agents having in their molecule at least three functional groups selected from the group consisting of amines and amides groups in a manner such that at least one of said functional groups is an amine group.

39. An emulsifying system according to claim 38, wherein the weight ratio of the total quantity of the compound or compounds A to the total quantity of the compounds A and B is from 5% to 95%.

40. An emulsifying system according to claim 38 wherein the emulsifying agents A are selected from the group consisting of:
the monoamines of formula $R_6NH_2$,
the diamines and amidoamines of formula R—(CO)$_r$—NH—($C_nH_{2n}$)—$NH_2$ the amines of the formula

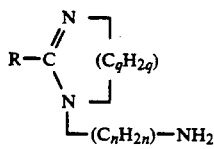

the quaternary ammonium compounds of the formula $(R_7)_jN^+(R_8)_hY^-$ while the emulsifying agents B are selected from the group consisting of the polyamines and the amidopolyamines of the formula

wherein R represents in these formulae a hydrocarbyl radical, having up to 22 carbon atoms, m and n, can be identical or different, being integers from 1 to 8, r being equal to 0 to 1, g designating an integer from 2 to 10, s representing an integer from 1 to 6, the $R_7$'s, can be identical or different, and designate $C_6$ to $C_{22}$ hydrocarbyl radicals which can be substituted with one or more functional groups, said hydrocarbyl radicals being selected from alkenyl or alkyl radicals or a benzyl radical, the $R_8$'s can be identical or different and represents alkyl or hydroxyalkyl radicals from $C_1$ to $C_6$, $Y^-$ designates an anion of a mineral acid or of an organic acid, h being a number equal to (4-j) and j representing a number assuming the values 1, 2 or 3.

41. An emulsifying system according to claim 40 wherein R is alkyl or alkenyl of from $C_8$ to $C_{22}$; m and n are integers of from 1 to 6; g is an integer of from 2 to 4; s is an integer of from 1 to 3; $Y^-$ is an anion selected from the group of chloride, acetate and formate anion.

42. An emulsifying system according to claim 28 wherein the emulsifying agents A are selected among the compound of the formula:

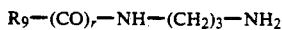

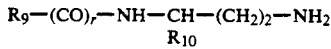

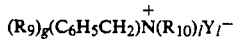

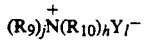

wherein $R_9$ designates an alkyl or alkenyl radical from $C_{12}$ to $C_{22}$, $R_{10}$ represents an alkyl or hydroxyalkyl radical from $C_1$ to $C_3$, $Y^-_1$ is a chloride or acetate anion, l is a number equal to (3-g), g is a number assuming the values 1, 2 or 3, r is equal to 0 or 1, h is a number equal to (4-j) and j designates a number assuming the values 1, 2 or 3.

43. An emulsifying system according to claim 42 wherein $R_9$ is stearyl or oleyl.

44. An emulsifying system according to claim 28 wherein the emulsifying agents B are selected among the compounds of formulae

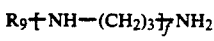

and

-continued

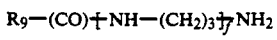

wherein f designates a number assuming the values 2, 3, 4 or 5 and $R_9$ represents an alkyl or alkenyl radical from $C_{12}$ to $C_{22}$.

45. An emulsifying system according to claim 44 wherein $R_9$ is stearyl or oleyl.

46. An emulsifying system according to claim 28 wherein it additionally contains a thickening agent consisting of one or more water-soluble organic compounds capable, within a pH range from 3 to 9, to increase the viscosity of a cationic emulsion of bitumen/polymer binder without modifying the viscosity of the aqueous phase alone of said emulsion.

47. An emulsifying system according to claim 46, wherein said thickening agent is a water-soluble natural gum.

48. An emulsifying system according to claim 46, wherein said thickening agent is a water-soluble polyurethane of low molecular weight, which results from the reaction of a polyisocyanate with a polyester-polyol or a polyether polyol.

49. An emulsifying system according to claim 46 wherein the weight of thickening agent represents from 5 to 30% of the total weight of the combination formed by the cationic nitrogen-containing emulsifying agent, the carboxylated adjuvant and the thickener.

50. An emulsifying system according to claim 28 which is useful for the preparation of cationic emulsions of bituminous binders of the bitumen/polymer type.

51. Emulsions according to claim 1 wherein the bituminous binder is at least one member selected from the group consisting of bitumens modified by olefinic polymers, bitumens modified by olefinic polymers and grafted with elastomers, bitumens modified by mixtures of fatty acids and higher alcohols, bitumens modified by mixtures of fatty acids and higher alcohols and grafted by elastomers, bitumens modified by norbornene, bitumens modified by dihalopolybutadienes and block copolymers, bitumens modified by dihalopolybutadienes and covulcanizable elastomers, bitumens modified by block copolymers of styrene with one monomer selected from the group consisting of butadiene, isoprene and carboxylated diene, bitumens modifed by polyethylene waxes, bitumens modified by elastomeric acrylic polymers, bitumens modified by polymers selected from the group consisting of polyvinylic alcohols, polyamides, polyesters and polyurethanes, bitumens modified by copolymers of olefins, bitumens modified by copolymers of olefins and vinyl monomers, bitumens modified by chlorinated elastomers, bitumens modified by halogenated or silicated polymers, bituminous compositions obtained by bringing into contact one bitumen with one mother solution containing a polymer, at least one member selected from the group consisting of sulfur, a polysulfide and a reactive agent as well as at least one member selected from the group consisting of a petroleum fraction and a coal oil, and mixtures of such modified bitumens.

52. Emulsions according to claim 1 wherein the bitumenous binder comprises a bituminous composition obtained by bringing into contact a styrene/conjugated diene block copolymer, at least one member selected from the group consisting of sulfur, a polysulfide and a reactive agent, and at least one member selected from the group consisting of a petroleum fraction and a coal oil.

53. An emulsion of claim 1 containing from about 0.03 to about 3.0% by weight of emulsion of the cationic nitrogen containing emulsifying agent and from about 0.005% to 0.5% by weight of the emulsion of the water soluble sequestering salt which displays substantially no emulsifying properties.

54. A cationic emulsion which comprises water, bituminous binders selected from the group consisting of (a) a bitumen having at least one polymer added thereto, (b) a bitumen modified by at least one polymer, (c) a bitumen modified by at least one polymer in the presence of at least one of sulfur, and an agent releasing sulfur, (d) mixtures of the bitumens and (e) mixtures of at least one of the bitumens with a fluxing agent, selected from the group consisting of petroleum fractions, coal oil and mixtures thereof, from about 0.03% to about 3% by weight of the emulsion of at least one cationic nitrogen-containing emulsifying agent, an amount of an acid to provide a pH in the phase of from about 3 to about 9 and from 0.005 to 0.5% by weight of the emulsion of at least one watersoluble sequestering salt of a polyfunctional nitrogen-containing carboxylic acid composition having substantially no emulsifying properties and a sequestration power with respect to metal ions, in a pH range of about 3 to about 9, equivalent to fixation of at least 5 mg. calcium ions per gram of salt wherein the weight of the cationic nitrogen-containing emulsifying agent is from about 25% to about 90% of the total weight of the emulsifying agent and water soluble sequestering salt.

* * * * *